United States Patent

Kong

[15] 3,688,866

[45] Sept. 5, 1972

[54] NOISE MUFFLER FOR MAGNETIC TAPE VACUUM COLUMN

[72] Inventor: Ning Kong, Boulder, Colo.

[73] Assignee: International Business Machine Corporation, Armonk, N.Y.

[22] Filed: Aug. 30, 1971

[21] Appl. No.: 176,081

[52] U.S. Cl. ..................181/33 K, 181/33 D, 181/53, 181/59, 181/36 D

[51] Int. Cl. ..........F01n 1/02, G11b 1/00, G11b 5/10

[58] Field of Search ..........274/4 R, 11 R, 11 F, 11 E; 181/33 R, 33 D, 33 K, 35 R, 41, 49, 53, 54, 48, 59, 36 R, 36 D

[56] References Cited

UNITED STATES PATENTS

| | | | |
|---|---|---|---|
| 1,724,163 | 8/1929 | Youngberg | 181/33 K |
| 3,476,210 | 11/1969 | Carlson | 181/33 K |
| 3,513,938 | 5/1970 | Buehner et al. | 181/33 K |

FOREIGN PATENTS OR APPLICATIONS

| | | | |
|---|---|---|---|
| 254,069 | 1/1963 | Australia | 181/33 K |
| 1,521,057 | 3/1968 | France | 181/33 K |
| 492,502 | 9/1938 | Great Britain | 181/33 K |

*Primary Examiner*—Robert S. Ward, Jr.
*Attorney*—Homer L. Knearl et al.

[57] ABSTRACT

Noise in the frequency range of 60 to 3,000 Hz generated by movement of magnetic tape in a vacuum column is muffled by use of Helmholtz cavities. The connecting ports to the cavities are placed near the top of the vacuum column close to the source of the noise and also where they provide an impedance mismatch barrier to sound waves trying to exit from the top of the vacuum column. The size of the ports and location of the ports in the vacuum columns are predetermined so that the ports will not inhibit the loading of the tape loop into the vacuum column.

9 Claims, 3 Drawing Figures

NOISE MUFFLER FOR MAGNETIC TAPE VACUUM COLUMN

BACKGROUND OF THE INVENTION

This invention relates to muffling noise emitted from the vacuum columns in a magnetic tape transport. More particularly, the invention relates to containing the noise generated by the movement of magnetic tape in a vacuum column within the vacuum column and dissipating that noise within the vacuum column.

As the speed of movement and acceleration of magnetic tape in a magnetic tape transport increases, sound waves created by the tape become a noise problem during operation of the tape transport. In fact, the highly compliant conditions formed by the tape loop in a vacuum column take the tape loop a credible low-frequency speaker. Of course, during data processing operation, low-frequency sound waves created by the stop/go motion of the tape are undesirable.

In the past, this noise produced by the tape loop in the vacuum column has been essentially sealed off from the outside by the use of a door on the front of the tape transport. This solution to noise generated by the tape loop, however, is no longer adequate as tape speeds increase, interblock gaps decrease, and access time to data in a block decrease. While noise muffling can be advantageous at lower speeds and lower acceleration, certainly where speeds are running over 200 ips and acceleration of tape is running better than $3 \times 10^5$ in./sec.$^2$, noise muffling begins to become attractive to keep the operation of the tape transport at a relatively quiet level.

Helmholtz resonant cavities to muffle noise have been applied to many devices such as automobile engines and jet aircraft engines. These applications, however, are not particularly useful in muffling noise in a magnetic tape transport. The problems that require solution when muffling vacuum columns in a tape transport include the selection of noise baffles and the placement of noise baffles so as to achieve maximum muffling without adversely effecting the loading and running of tape in the vacuum columns.

SUMMARY OF THE INVENTION

In accordance with this invention, the noise of a tape transport vacuum column has been muffled by containing the sound waves generated by the tape within the vacuum column and dissipating the sound waves as much as possible within the column. Containment is achieved by providing an impedance mismatch near the top or mouth of each vacuum column whereby most of the sound waves generated in the column are reflected back inside the column. Connecting ports between the vacuum column and resonant cavities serve as side branches to provide the impedance mismatch which causes sound waves to be reflected back within the vacuum column. In addition, the resonant cavities dissipate the sound waves in two ways. First, the resonant cavities will absorb energy from the sound waves that cause the cavities to resonate, and, second, sound waves emanating from the resonant cavities back into the vacuum column will interfere with sound waves of the same frequency in the vacuum column.

As a further feature of the invention, the size and arrangement of ports for connecting the vacuum column to the resonant cavities should be such that as the tape loop is being loaded into the vacuum column, the vacuum in the column will not be dumped around the tape loop via a port or side branch.

The great advantage of the invention is that high performance tape transports may be made as quiet in operation as previous slower speed tape transports. Without this invention, persons operating tape transports would pay the penalty of a noisy environment.

DESCRIPTION

Figure 1:
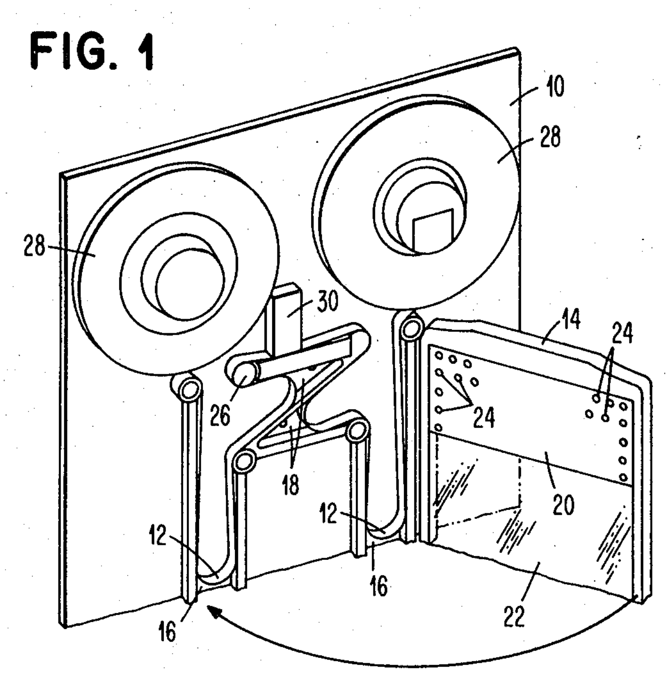
FIG. 1 shows a portion of the front of a tape transport with the noise muffling apparatus mounted in the door that forms the front wall of the vacuum columns.

FIG. 1 shows the preferred embodiment of the installation of the noise muffler on the vacuum column. Only the front of the tape transport 10 is shown. Magnetic tape 12 is shown in position in the vacuum columns as if the tape transport were operating. For ease of illustration, the glass door 14 that covers the main vacuum columns 16 and the stubby vacuum columns 18 has been swung open. The muffler 20 is mounted in the door 14 with the inner face of the muffler flush with the inner face of the glass panel 22 in the door 14. Ports or side branches 24 provide an air passage to connect the vacuum column to the resonant cavities in the muffler when the door 14 is closed over the vacuum columns.

The tape transport shown in FIG. 1 generates noise inside vacuum columns 16 and 18 when the tape loop in each column fluctuates from position to position in each column. As is well known, the short vacuum columns 18 mechanically decouple movement of a short piece of tape about capstan 26 from the remainder of the entire length of tape. Similarly, vacuum columns 16 tend to decouple motion of the reels 28 from the movement of the tape around the capstan and across the magnetic transducers at station 30. The decoupling is accomplished by rapid movement of the tape loop in each vacuum column (short or long). This rapid movement, however, generates the sound waves or noise that is objectionable.

The tape loops in the short columns 18 tend to produce the higher frequency noise while the tape loops in the longer vacuum columns 16 tend to produce the lower frequency noise. The frequency of noise, for example, would typically be from about 120 to 1,500 Hz; however, the frequency depends upon tape speed and acceleration of the tape.

Figure 2:
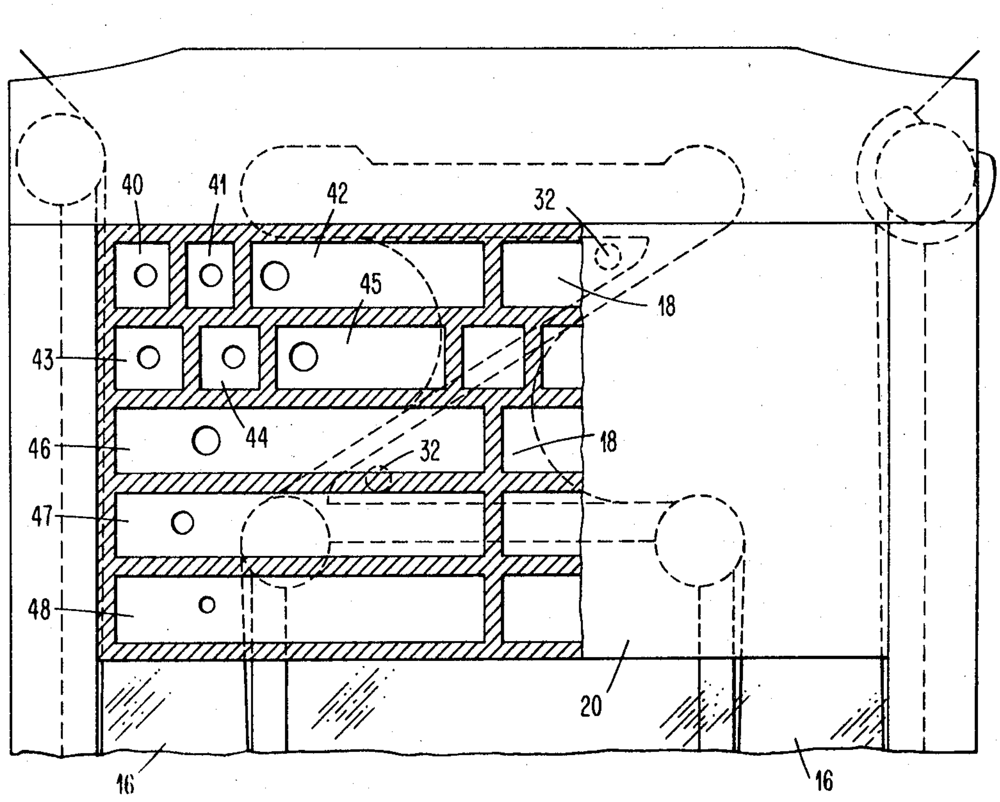
FIG. 2 is a cut-away of the noise muffling apparatus showing the arrangement of resonant cavities relative to the vacuum columns.

The position of the muffler when the door 14 is closed over the vacuum columns is more clearly shown in FIG. 2. Vacuum columns 16 and 18 along with the position of the tape loop in vacuum columns 18 is shown in phantom in FIG. 2 to the extent they would be covered by the door 14 with the muffler 20 installed. The front cover of the muffler on the left side is cut away so as to show the size of the resonant cavities and the position of the ports that connect each cavity to the vacuum columns. Ports 32, shown in phantom in FIG. 2, are the evacuating or vacuum ports to provide a vacuum in the short columns 18.

As can be seen in FIG. 2, the ports connect the resonant cavities to the vacuum columns near the mouth of the vacuum columns. The muffler 20 could be mounted on the back wall of the vacuum columns rather than in the door forming the front wall of the vacuum columns. In addition, the length of the connecting side branches or ports between the resonant cavities and the vacuum columns can be longer if it is desirable to move the resonant cavities away from the vacuum columns.

Some of the criteria for positioning the resonant cavity ports are as follows:

1. The ports should be positioned near the noise source;

2. The ports should be near the top of the vacuum columns to provide an impedance barrier which will reflect sound waves from the vacuum columns back into the vacuum columns;

3. The ports should be positioned so that during operation of the tape transport, the tape loops do not cross the ports except during loading;

4. The size of the ports and their arrangement is such that the vacuum in the vacuum column is not dumped around the tape loop as the tape loop is being loaded and moves across one or more ports;

5. The port for each resonant cavity should be positioned at distance of $n\lambda/4$ from a wall where $n$ is 1, 3, 5, 7, . . . and $\lambda$ is the wavelength of the natural frequency for the resonant cavity to which the port connects. While the above five criteria should be satisfied to provide a preferred embodiment of the invention, not all are necessarily required for an operative embodiment of the invention.

The more significant criteria are the placement of the ports near the tops of the vacuum columns to provide a reflective barrier to sound in the columns and the placement of each resonant cavity port as near as possible to the source of the frequencies that cavity is trying to dissipate. The higher frequencies tend to be generated by the tape loops in the short columns 18 and, therefore, the higher frequency resonant cavities should be placed near the top of the vacuum columns 18.

The design of the resonant cavities is given by the following equation:

$$f_n = (C/2\pi) \quad \sqrt{s/L'V}$$

where:

$f_n$ = resonant frequency $C$ = speed of sound $s$ = cross-sectional area of connecting port $L' = L + 1.7\,R$ where:

$L$ = the length of the neck of connecting port $R$ = the radius of connecting port V = volume of resonant cavity.

The design criteria for providing an impedance mismatch in acoustic chambers, and an explanation of how side branches or ports provide such an impedance mismatch is discussed on pp. 200–205 of *THE FUNDAMENTALS OF ACOUSTICS*, by Lawrence E. Kinsler and Austin R. Frey, John Wiley & Sons, Inc., New York, 1962.

The above general criteria can be used to design any muffler for the vacuum columns of the tape transport. The specific muffler shown in FIG. 2 was designed for a tape transport operating at 200 ips and experiencing accelerations of around $3 \times 10^5$ in./sec.$^2$. The frequency band of noise being generated by tape operating in vacuum columns at this speed is approximately 120 to 1,500 Hz. The following table gives the sizes and natural frequencies of the resonant cavities shown in FIG. 2 as identified by the reference numerals. The resonant cavities are only shown for the left half of the transport since the right half of the transport has a symmetrical set of resonant cavities.

| Resonant Cavity | Frequency Hertz | Cavity Volume In.$^3$ | Port Diameter In. |
|---|---|---|---|
| 40 | 1100 | 0.8 | .375 |
| 41 | 1000 | 0.95 | .375 |
| 42 | 500 | 4.75 | .437 |
| 43 | 900 | 1.15 | .375 |
| 44 | 800 | 1.45 | .375 |
| 45 | 600 | 3.2 | .437 |
| 46 | 400 | 7.2 | .437 |
| 47 | 320 | 7.2 | .312 |
| 48 | 250 | 7.2 | .25 |

Figure 3:
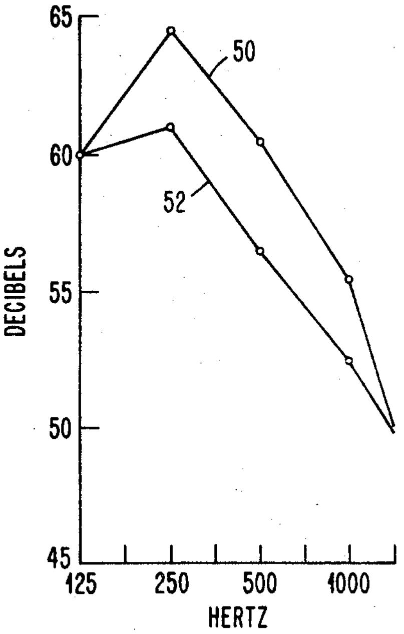
FIG. 3 shows the noise level of a tape transport without a muffler and of a tape transport with a muffler.

The effect of using this muffler is shown in FIG. 3. Curve 50 shows the noise level of a tape transport in a semi-anechoic chamber (floor reflective) with no muffler on the vacuum columns. Curve 52 shows the same tape transport noise level with the muffler installed. It is clear that in the frequency range the muffler is designed to operate, the noise level of the tape transport is being reduced by 3 or 4 db. A 3 to 4 db reduction in noise level represents a reduction in noise energy of about a factor of 2. This reduction in noise level is very noticeable to the human ear. The cumulative effect of a large room of tape transports quieted by the muffler can make the difference between a healthy and efficient environment for data processing operators and an inefficient or distracting environment for the operators.

While the invention has been particularly shown and described for a preferred embodiment using resonant cavities and connecting ports to provide reflection and dissipation of noise in vacuum columns, it will be appreciated by one skilled in accoustics that alternative reflectors and energy dissipators might be inserted into the vacuum column or placed near the top of the vacuum column. Sound deflectors or any sound absorbing material that could be retracted during tape loading immediately come to mind as alternatives for sound wave reflectors and dissipators. It will be appreciated by one skilled in the art that the above suggested changes and various other changes in form and details may be made therein without departing from the spirit and scope of the invention.

What is claimed is:

1. A noise muffler for a vacuum column in a magnetic tape transport for preventing the emission of noise from the vacuum column, said muffler comprising:

means for mismatching the acoustical impedance near the top of said column so that sound waves in the column will tend to be reflected at the top of the column back into the column;

means for generating interference between sound waves within the vacuum column so as to dissipate the noise within the vacuum column.

2. The apparatus of claim 1 wherein said means for generating comprises:

a plurality of resonant cavities connected to the vacuum column by ports near the top of the column, the natural frequency of each resonant cavity being such as to generate a cancelling sound wave in the vacuum column when the resonant cavity is energized by a sound wave in the vacuum column that is near the natural frequency of the resonant cavity.

3. The apparatus of claim 1 wherein said means for mismatching comprises:

a plurality of acoustical side branches connected to the vacuum column near the top of the vacuum column, each side branch forming an acoustical discontinuity so that sound waves in the vacuum column will tend to be reflected back within the vacuum column rather than passed out the top of the vacuum column.

4. The apparatus of claim 3 wherein said acoustical branches are small enough in size and located so that during tape loading in the vacuum column, the vacuum of the column will not be dumped around the tape via one or more of said side branches.

5. Method for muffling noise due to tape movement in a vacuum column of a magnetic tape transport comprising the steps of:

reflecting the sound waves generated by the tape in the vacuum column back into the vacuum column;

dissipating the energy of sound waves in the vacuum column so that the noise generated by tape movement in the vacuum column is contained in and dissipated in the vacuum column.

6. The method of claim 5 wherein said step of reflecting comprises the steps of:

forming an acoustical discontinuity;

positioning the acoustical discontinuity at the top of the vacuum column so that there is an acoustical impedance mismatch at the top of the vacuum column forming a barrier to the transmission of sound waves out the top of the vacuum column.

7. The method of claim 5 wherein said dissipating step comprises the steps of:

dissipating the energy of sound waves from the vacuum column in resonant cavities attached to the vacuum column;

generating interference sound waves in resonant cavities attached to the vacuum column;

passing these interference sound waves from the resonant cavity into the vacuum column to interfere with the sound waves of the same frequency inside the vacuum column.

8. In a magnetic tape transport having a vacuum column for buffering high speed movement of the magnetic tape, apparatus for muffling noise generated by movement of tape in the vacuum column so that the noise will not be emitted from the mouth of the vacuum column, said apparatus comprising:

a plurality of Helmholtz cavities attached to the vacuum column near the mouth of the vacuum column, the Helmholtz cavities being of various sizes and having various size connecting said cavities ports to the vacuum column so that a band of frequencies making up the noise generated by the magnetic tape movement will be muffled;

said ports connecting the vacuum column to said cavities being positioned relative to a wall in the vacuum column such that the distance between the port and the wall is $n\lambda/4$ where $\lambda$ is wavelength of the natural frequency of the cavity and $n = 1, 3, 5, 7, \ldots$.

9. The apparatus of claim 8 wherein said connecting ports are of such size and position in the vacuum column that during loading of the magnetic tape into the column, the vacuum of the vacuum column will not be dumped around the magnetic tape as it passes across one or more connecting ports.

* * * * *

PO-1050
(5/69)

UNITED STATES PATENT OFFICE
CERTIFICATE OF CORRECTION

Patent No. 3,688,866 Dated September 5, 1972

Inventor(s) Ning Kong

It is certified that error appears in the above-identified patent and that said Letters Patent are hereby corrected as shown below:

Column 6, line 24, after "size" insert --ports--.

Column 6, line 25, after "cavities" delete "ports".

Signed and sealed this 10th day of April 1973.

(SEAL)
Attest:

EDWARD M.FLETCHER,JR.
Attesting Officer

ROBERT GOTTSCHALK
Commissioner of Patents